Aug. 7, 1923.

H. M. STOLLER ET AL 1,464,119

FAULT LOCATOR FOR ELECTRIC CABLES

Filed Dec. 8, 1920

Inventors:
Hugh M. Stoller
Edgar M. Matthews
by Joel R. Palmer
Att'y.

Patented Aug. 7, 1923.

1,464,119

UNITED STATES PATENT OFFICE.

HUGH M. STOLLER, OF NEW YORK, AND EDGAR M. MATTHEWS, OF JAMAICA, NEW YORK, ASSIGNORS TO WESTERN ELECTRIC COMPANY, INCORPORATED, OF NEW YORK, N. Y., A CORPORATION OF NEW YORK.

FAULT LOCATOR FOR ELECTRIC CABLES.

Application filed December 8, 1920. Serial No. 429,235.

*To all whom it may concern:*

Be it known that we, HUGH M. STOLLER and EDGAR M. MATTHEWS, both citizens of the United States, residing at New York city, county of New York, and State of New York, and Jamaica, in the county of Queens and State of New York, respectively, have invented certain new and useful Improvements in Fault Locators for Electric Cables, of which the following is a full, clear, concise, and exact description.

This invention relates to an exploring coil which is adapted for use in locating faults in electric cables. Such an exploring coil is generally known as a fault locator.

In accordance with one feature of this invention, a circuit arrangement for a fault locator is provided which possesses only three terminals as compared with four in the former types.

In accordance with another feature of this invention, the present circuit arrangement permits of the inclusion of a condenser to counteract the impedance of the receiver without necessitating an increase in the number of terminals.

Figure 1:
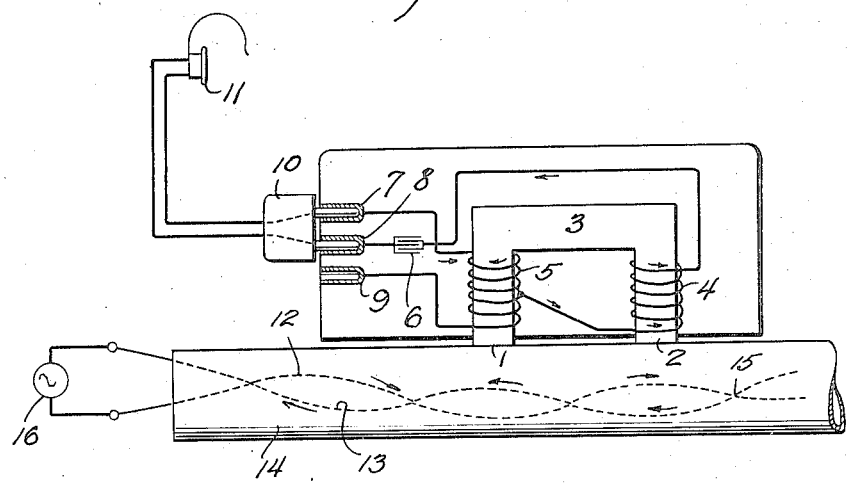
Figure 2:
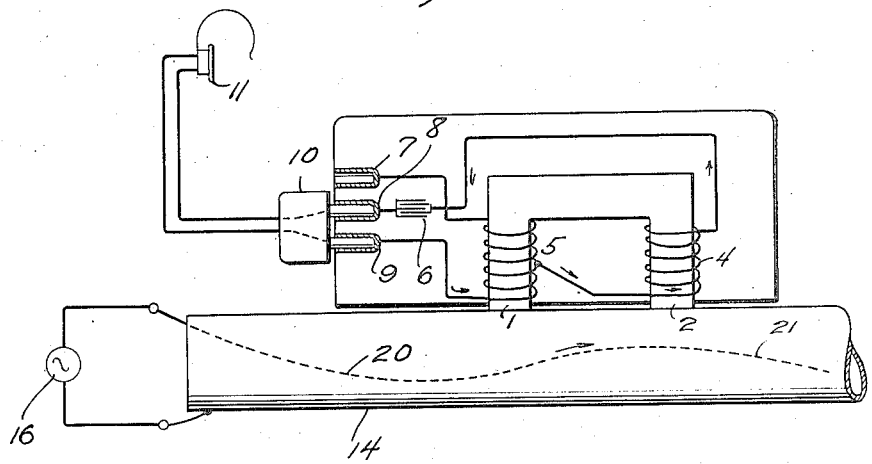

The invention will be more readily understood by reference to the drawing in which, Fig. 1 shows the fault locator in its operating position to determine a short circuit and Fig. 2 shows the fault locator in its operating position to determine a ground. In locating crosses, the fault locator is preferably placed at right angles to the axis of the cable, but the circuit connections in such a case are similar to those used in detecting grounds, which are shown in Fig. 2.

In Fig. 1 the two poles, 1 and 2 of core 3 are shown surrounded by the coils 4 and 5. One end of coil 4 is connected to the mid-point of coil 5 which has twice as many turns as coil 4, while the other is connected to the condenser 6. Three terminal jacks, 7, 8 and 9 are shown as being located on the left-hand side of the device. Coil 5 is connected directly to terminals 7 and 9, while the condenser 6 is connected to terminal 8. The twin plug 10, associated with a current detecting means such as a receiver 11, is shown in engagement with terminals 7 and 8. For the purpose of explanation it will be assumed that the two conductors 12 and 13 in cable 14 are short circuited at point 15. A source of alternating power 16 is connected to these two conductors, which, being in contact at point 15 enables a continuous electrical circuit to be realized. Since 16 represents a source of alternating current, the direction of flow will be constantly changing. For the present purpose of illustration, one instant of time will be considered, when the direction of flow is as indicated in Fig. 1 by the arrows. Thus, at this time, pole 2 will be a north pole and pole 1 a south pole, and the direction of flow of the induced current of coils 4 and 5 will be as shown by the arrows. The currents induced by the magnetic state of poles 1 and 2 are thus seen to be cumulative. The circuit can be traced as follows: Starting at coil 4 the current passes through condenser 6, terminal 8 to the receiver 11, then to terminal 7, through the upper half of coil 5 and back to coil 4. In determining the location of the fault, the fault locator is moved along the cable in the ordinary manner, as for example, described in Patent No. 1,170,017 granted to H. M. Stoller, February 1, 1916.

When crosses or grounds are to be located the twin plug 10 is placed in engagement with terminals 8 and 9 as shown in Fig. 2. In this figure the conductor 20 is assumed to be grounded to the cable sheath 14 at point 21. In this case, as in that considered above, a particular instant of time will be considered, when the alternating current from the source 16 is passing in the direction indicated by the arrows. In these directions poles 1 and 2 both become north poles, which in turn induce currents in the two coils 4 and 5 in the direction indicated by the arrows. Thus, if the circuit is traced it will be apparent that, starting at coil 4, the current passes through condenser 6 to terminal 8, thence to the receiver 11, back to terminal 9, through the lower half of coil 5 to coil 4. In this case as in the one referred to herein above, the induced currents are cumulative, thus giving the maximum induced current which may be obtained. The location of the fault in this case is determined in the ordinary manner.

Although a condenser has been shown in the device above described, it may be omitted from the circuit when it is not necessary to neutralize the inductive reactance of the receiver or other current detecting means which might be employed. It would be apparent, however, that the circuit arrangement which forms the subject of this invention permits the inclusion of the condenser without a further addition of terminal jacks.

While a specific form of terminal jack is shown as being used in the fault locator made in accordance with this invention, it is to be understood that any suitable means may be employed in place of such terminal jacks without departing from the spirit of the invention. The phrase "terminal jacks" is used in the general meaning of the term, and is intended to cover all devices which will effect a ready connection with an external circuit.

What is claimed is:

1. A device for locating faults in electric cables, comprising a current detecting device, a U-shaped magnet core, a pair of windings thereon, a circuit having three terminal jacks, and switching means for connecting said device and said windings in said circuit by means of two of said three terminal jacks, and for changing the connections of a portion of one of said windings with respect to the other by means of two of said three terminal jacks.

2. A fault locator for electric cables, comprising current detecting means, a U-shaped magnet core, windings on each leg thereof included in an electrical circuit, said circuit terminating in three terminal jacks which are adapted to be connected with said current detecting means by switching means, said detecting means being of such construction that a cumulative effect may be realized therein by connecting said switching means to two of said three terminal jacks when current is passing through said windings in the same direction.

3. A fault locator for electric cables comprising current detecting means, a U-shaped magnet core, windings on each leg thereof included in an electrical circuit, said circuit terminating in three terminal jacks which are adapted to be connected with said current detecting means by switching means, said detecting means being of such construction that a cumulative effect may be realized therein by connecting said switching means to two of said three terminal jacks when current is passing through said windings in the opposite direction 4. In combination with a fault locator for electric cables, a circuit including a first and second winding, each end of said first winding terminating in a terminal jack, one end of said second winding being connected to the mid-point of said first winding, the other end of said second winding being connected to a terminal jack.

5. In a combination with a fault locator for electric cables, a circuit including a first and second winding, each end of said first winding terminating in a terminal jack, one end of said second winding being connected to the mid-point of said first winding, the other end of said second winding being connected to one side of a condenser, the other side of said condenser being connected to a terminal jack.

6. In a device for exploring the field of electric cable conductors, comprising a U-shaped magnet core, a winding on each leg thereof, one of said windings having twice as many turns as the other winding, one end of the latter being connected to the mid-point of the former, and the other end and the ends of said first mentioned winding being each connected to a terminal jack.

7. In a device for exploring the field of electric cable conductors, comprising a U-shaped magnet core and a winding on each leg thereof, one of said windings having twice as many turns as the other winding, one end of the latter being connected to the mid-point of the former, and the other end to one side of a condenser, the other side of said condenser being connected to a terminal jack, the ends of said first mentioned winding being each connected to a terminal jack.

8. A fault locator for electric cables, comprising a current detecting device, a U-shaped magnet core, a winding on each leg thereof, a circuit, switching means for connecting said current detecting device and said windings in said circuit, and for reversing the connections of a portion of one of said windings with respect to the other winding, and a condenser included in said circuit to neutralize the inductive reactance of said current detecting means.

In witness whereof, I hereunto subscribe my name this 1st day of December, A. D. 1920.

HUGH M. STOLLER.

In witness whereof, I hereunto subscribe my name this 4th day of December, A. D. 1920.

EDGAR M. MATTHEWS.